(12) United States Patent
Marmur et al.

(10) Patent No.: US 9,902,305 B2
(45) Date of Patent: Feb. 27, 2018

(54) UNIVERSAL ROLL-OFF FRAME

(71) Applicant: Omaha Standard, LLC, Council Bluffs, IA (US)

(72) Inventors: Lazar Marmur, Plainsboro, NJ (US); Kenneth E. Bailey, Vineland, NJ (US); Wayne Harry Davis, Lumberton, NJ (US)

(73) Assignee: Omaha Standard, LLC, Council Bluffs, IA (US)

( * ) Notice: Subject to any disclaimer, the term of this patent is extended or adjusted under 35 U.S.C. 154(b) by 0 days.

(21) Appl. No.: 15/177,975

(22) Filed: Jun. 9, 2016

(65) Prior Publication Data
US 2017/0355293 A1  Dec. 14, 2017

(51) Int. Cl.
*B60P 1/30* (2006.01)
*B60P 3/40* (2006.01)
*B60P 1/52* (2006.01)

(52) U.S. Cl.
CPC .................... *B60P 1/30* (2013.01); *B60P 1/52* (2013.01); *B60P 3/40* (2013.01)

(58) Field of Classification Search
CPC ..... B60P 1/6454; B60P 1/6463; B60P 1/6427; B60P 1/6418
See application file for complete search history.

(56) References Cited

U.S. PATENT DOCUMENTS

| | | | | |
|---|---|---|---|---|
| 3,399,795 A | * | 9/1968 | Clucker | B60P 1/6454 414/500 |
| 4,840,532 A | * | 6/1989 | Galbreath | B60P 1/6454 414/479 |
| 4,934,898 A | | 6/1990 | Galbreath | |
| 4,986,719 A | | 1/1991 | Galbreath | |
| 5,088,875 A | | 2/1992 | Galbreath et al. | |
| 6,068,440 A | * | 5/2000 | Lang | B60P 7/13 414/480 |
| 7,112,030 B2 | * | 9/2006 | Renziehausen | B60P 1/6454 414/477 |
| 7,192,239 B2 | | 3/2007 | Marmur et al. | |
| 7,568,881 B1 | * | 8/2009 | Collins | B60P 1/6463 414/346 |
| 8,029,228 B2 | * | 10/2011 | Marmur | B60P 1/6454 280/400 |
| 8,961,097 B2 | * | 2/2015 | Doron | B60P 1/6454 414/482 |

(Continued)

*Primary Examiner* — Kaitlin S Joerger
(74) *Attorney, Agent, or Firm* — Hodgson Russ LLP

(57) ABSTRACT

An apparatus for loading and unloading containers of various sizes onto and off of a roll-off vehicle comprises a top frame and at least one lift actuator operable to pivot the top frame away from a horizontal home position to rearwardly incline the top frame. The top frame includes a main portion, a head portion longitudinally displaceable relative to the main portion, a plurality of sheaves, a cable extending through the sheaves, and a hoist actuator operable to displace the head portion between a retracted position and an extended position. The cable has a fixed end coupled to the head portion and a free end for coupling to a container. The hoist actuator is operated while the top frame is away from the home position to displace the head portion toward the extended position to load a container onto the vehicle, and toward the retracted position to unload the container.

12 Claims, 5 Drawing Sheets

(56) References Cited

U.S. PATENT DOCUMENTS

| | | | |
|---|---|---|---|
| 9,004,842 B2* | 4/2015 | Downing | B60P 1/6454 |
| | | | 414/494 |
| 2006/0062660 A1* | 3/2006 | Marmur | B60P 1/6454 |
| | | | 414/498 |
| 2011/0250040 A1* | 10/2011 | Hofstra | B60P 1/6454 |
| | | | 414/497 |
| 2016/0257237 A1* | 9/2016 | Dagenais | B60P 1/433 |

* cited by examiner

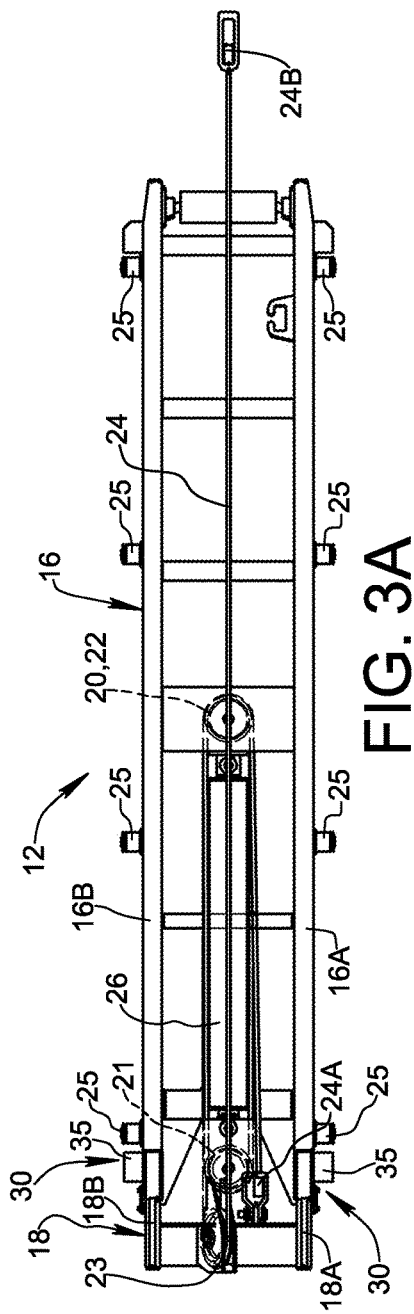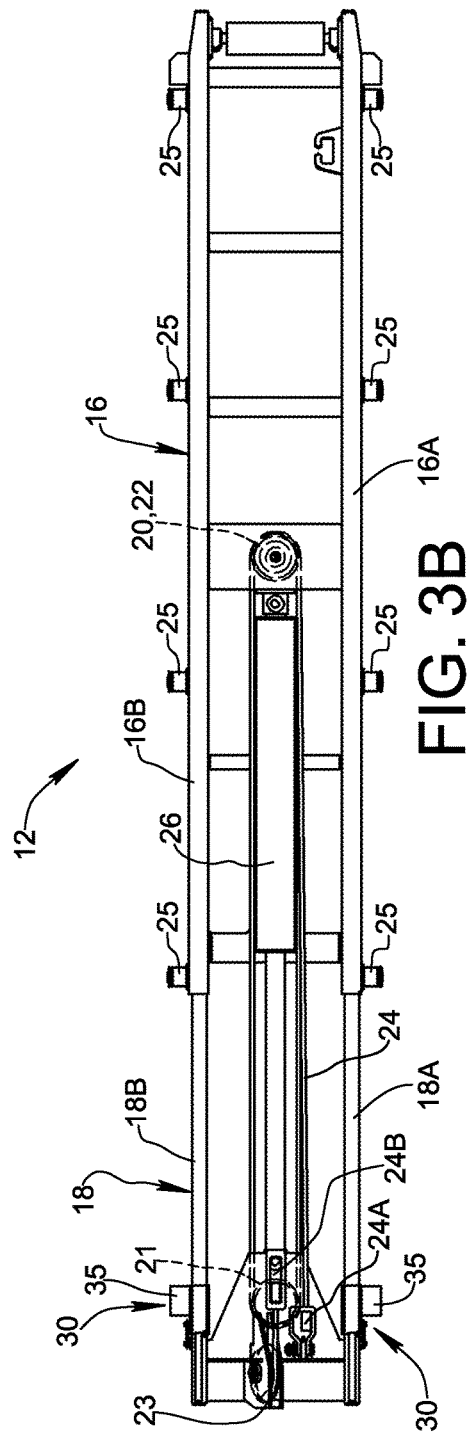

UNIVERSAL ROLL-OFF FRAME

FIELD OF THE INVENTION

The present invention relates generally to roll-off transport vehicles equipped to load a large container onto the vehicle and to unload the container from the vehicle. The large container is typically a waste container.

BACKGROUND OF THE INVENTION

Roll-off vehicles are known to include a top frame mounted on the vehicle for supporting the container. The top frame is pivotally mounted to be tilted away from a horizontal home position such that the top frame is inclined toward a rear of the vehicle to assist in loading and unloading the container. The top frame may be tilted by one or more lift actuators, for example hydraulically powered linear actuators, arranged between the top frame and a subframe fixed to the vehicle. The top frame may incorporate a cable hoist mechanism having a set of sheaves and a cable wound around the sheaves. Some of the sheaves may be mounted on one or more movable shoe members that are displaceable along the top frame to take up an end of the cable coupled to the container to pull the container onto the top frame during loading. Sheave displacement may be reversed to unload the container. A locking mechanism may be provided at the front of the frame for engaging a to secure the U.S. Pat. No. 7,192,239 to Marmur et al. discloses a roll-off frame equipped with a cable hoist mechanism having a front sheave and a pair of rear sheaves at fixed locations on the frame, and two intermediate sheaves carried by respective movable shoe members for displacement along the frame relative to the fixed front and rear sheaves. A linear actuator is operable to displace a primary shoe member during a first stage while a secondary shoe member remains stationary. During a second stage, the primary shoe member abuts with the secondary shoe member such that further displacement of the primary shoe causes corresponding displacement of the secondary shoe member. The first stage provides enhanced power and slow speed as the container is initially pulled forward, and the second stage provides greater speed and less power.

U.S. Pat. No. 8,029,228 to Marmur discloses a roll-off frame in which the cable hoist mechanism includes a single movable shoe member for displacing a multi-grooved sheave relative to a pair of sheaves mounted at a fixed forward location on the frame. A locking mechanism is provided near the front of the frame to secure front rollers or a lateral member of the container to hold the container in position on the frame. The locking mechanism includes a pair of laterally spaced front hook members on a top frame portion arranged to receive the front rollers or lateral member of the container when the container is pulled fully forward onto the top frame portion, and a pair of laterally spaced locking struts fixed to a subframe portion and positioned to block the hook openings when the top frame is pivoted down to a horizontal home position with respect to the subframe.

The prior art roll-off frames taught by the aforementioned U.S. Pat. Nos. 7,192,239 and 8,029,228 are well-suited for handling containers of a particular length for which the roll-off frame is designed. However, if these roll-off frames are used to load and unload containers of different lengths, the lift actuators may be subjected to unintended loading conditions caused by differences in the location of the center of gravity of the container and its contents.

U.S. Pat. No. 4,840,532 to Galbreath teaches a "universal" roll-off frame intended for use with containers of various lengths. The roll-off frame is characterized by a two-part top frame having a main portion and a forward head portion telescopically extendable and retractable relative to the main portion to adjust the overall length of the top frame. The roll-off frame of Galbreath incorporates a cable hoist mechanism having a first pair of laterally spaced sheaves mounted on a movable shoe member that slides along the main portion of the top frame, a second pair of laterally spaced sheaves mounted at a fixed location at a front end of the main portion, and a front sheave mounted at a front end of the extendable head portion of the frame. A pair of hydraulic linear actuators are mounted to displace the movable shoe member to change the longitudinal distance between first pair of sheaves and the second pair of sheaves. A third hydraulic linear actuator is arranged to extend and retract the head portion of the top frame relative to the main portion of the top frame. An end of the hoist cable is attached to the main portion of the top frame, and the cable is wound around the sheave pairs and the front sheave.

Before using the roll-off frame of Galbreath, the operator must adjust the head portion relative to the main portion to achieve a desired overall length for a given container, and releasably fix the head portion in position to prevent further movement of the head portion relative to the main portion. For this purpose, a series of longitudinally spaced holes are provided along lateral sides of the main portion and head portion, and shot pin actuator is operable to insert a pair of pins into aligned holes on each side of the top frame to lock the head portion in position. Thus, in Galbreath, the length of the top frame is adjustable to one of a plurality of discrete length settings prior to use. The length of the top frame in Galbreath does not adjust during loading or unloading of a container. The hydraulic actuator for extending and retracting the head portion does not contribute power to the cable hoist mechanism. Galbreath has a total of five hydraulic actuators: two lift actuators for tilting the top frame, two actuators for displacing the shoe member, and one actuator for extending and retracting the head portion of the top frame. Consequently, Galbreath requires a complex hydraulic circuit.

Galbreath also describes a locking mechanism for securing the container on the top frame. The locking mechanism of Galbreath includes a pair of laterally spaced front hook members on a top frame portion arranged to receive the front rollers or lateral member of the container, and a pair of laterally spaced spring-loaded detents adjacent the hook members. The detents pivot downward against the spring bias as the container is pulled into its fully forward position, and pivot back up once the container is in place.

The locking mechanisms described in U.S. Pat. No. 8,029,228 and in the patent to Galbreath have drawbacks. The locking mechanism in U.S. Pat. No. 8,029,228 is useful where the top frame of the apparatus has a fixed length with no extendable head. However, if an extendable head is provided, the use of locking struts fixed to the subframe is precluded because the position of the front hooks on the extendable head will change with respect to the locking struts fixed to the subframe. The locking mechanism in Galbreath overcomes this problem, but does so using a spring mechanism that may become jammed with exposure to moisture, dirt and debris. If jamming occurs, the operator may be unaware that the detents have failed to spring up into blocking position.

SUMMARY OF THE INVENTION

The invention provides an apparatus for loading and unloading containers of various sizes onto and off of a roll-off vehicle. The invention addresses shortcomings of the prior art mentioned above.

The apparatus generally comprises a top frame mounted on the vehicle to pivot about a transverse hinge axis relative to the vehicle, and at least one lift actuator operable to rearwardly incline the top frame relative to the vehicle by pivoting the top frame about the hinge axis away from a horizontal home position of the top frame. The top frame includes a main portion, a head portion movably connected to the main portion for longitudinally directed displacement relative to the main portion, a plurality of sheaves including a rear sheave mounted to the main portion and a front sheave mounted to the head portion, a cable extending from a fixed end to a free end by way of the plurality of sheaves, and a hoist actuator operable to longitudinally displace the head portion relative to the main portion between a retracted position and an extended position.

The fixed end of the cable is coupled to the extendable and retractable head portion, and the free end of the cable is configured for coupling to a container. The hoist actuator is operated while the top frame is away from the horizontal home position to displace the head portion toward the extended position to load a container onto the roll-off vehicle. The hoist actuator is also operated while the top frame is away from the horizontal home position to displace the head portion toward the retracted position to unload the container off of the roll-off vehicle.

In a further aspect of the invention, a lockdown mechanism is provided that positively ensures engagement. The lockdown mechanism may be associated with the head portion for confining a front roller of the container, wherein the lockdown mechanism is automatically locked by pivoting the top frame into the horizontal home position, and wherein the lockdown mechanism is automatically unlocked by pivoting the top frame away from the horizontal home position. The lockdown mechanism may include a front hook member defining a rearwardly facing opening for receiving the front roller of the container, and a gate member movably connected to the head portion. The gate member is movable relative to the head portion between an open position wherein the gate member does not block the opening of the front hook member and a closed position wherein the gate member at least partially blocks the opening of the front hook member. When the top frame is pivoted into the horizontal home position, a subframe engages the gate member to move the gate member to the closed position, and when the top frame is pivoted away from the horizontal home position, the gate member is moved by gravity to the open position. The gate member may include a support flange for supporting a front portion of the container. The locking mechanism is suitable for use with a top frame having a displaceable head portion, but may also be used with a top frame of fixed length.

BRIEF DESCRIPTION OF THE DRAWING VIEWS

The nature and mode of operation of the present invention will now be more fully described in the following detailed description of the invention taken with the accompanying drawing figures, in which:

FIG. 3A is a plan view of a top frame of the cable hoist apparatus shown in FIG. 1, wherein a head portion of the top frame is in a retracted position;

FIG. 3B is a view similar to that of FIG. 3A, wherein the head portion of the top frame is in an extended position;

DETAILED DESCRIPTION OF THE INVENTION

Figure 1:
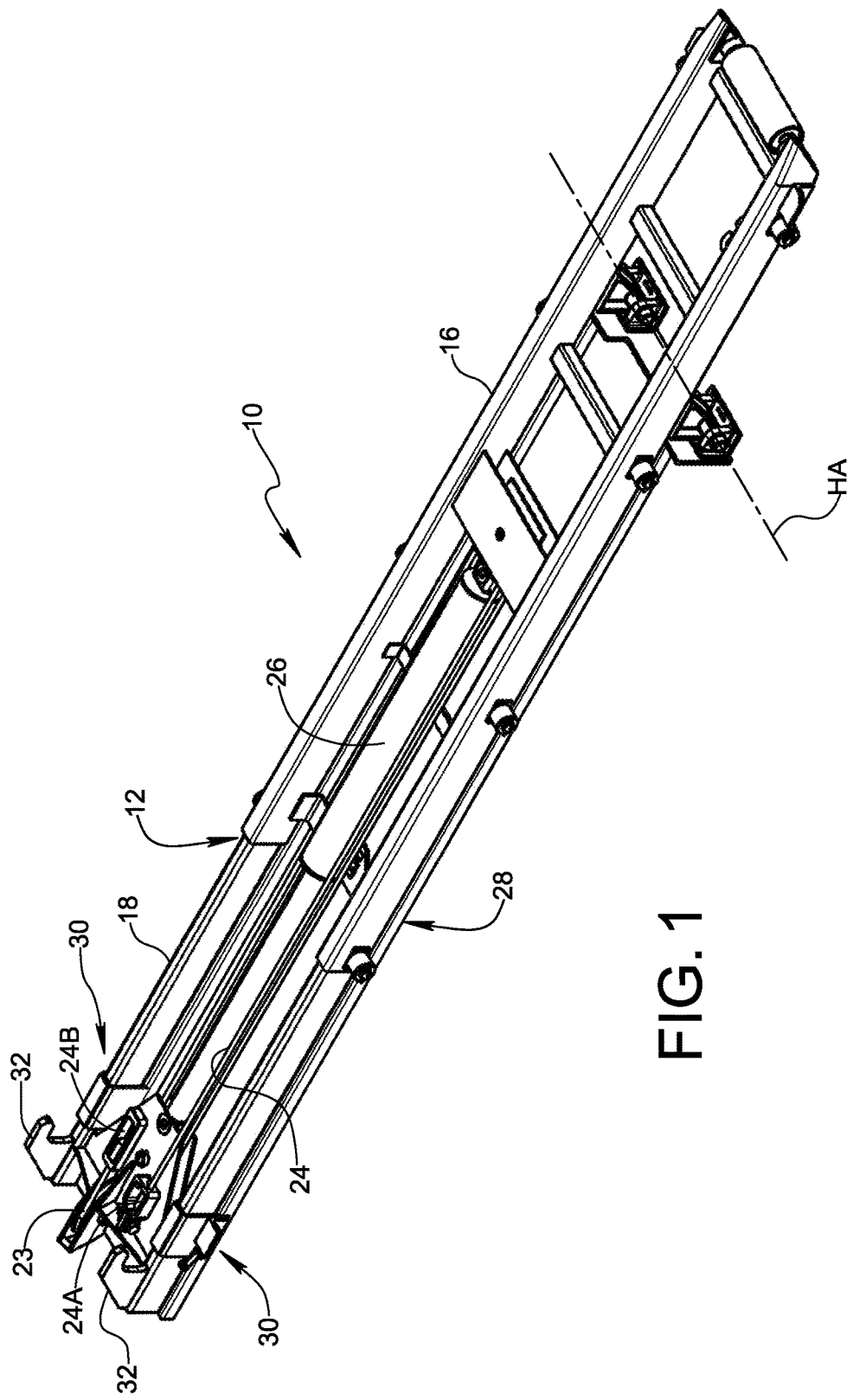
FIG. 1 is a perspective view of a roll-off cable hoist apparatus formed in accordance with an embodiment of the present invention.
Figure 2:
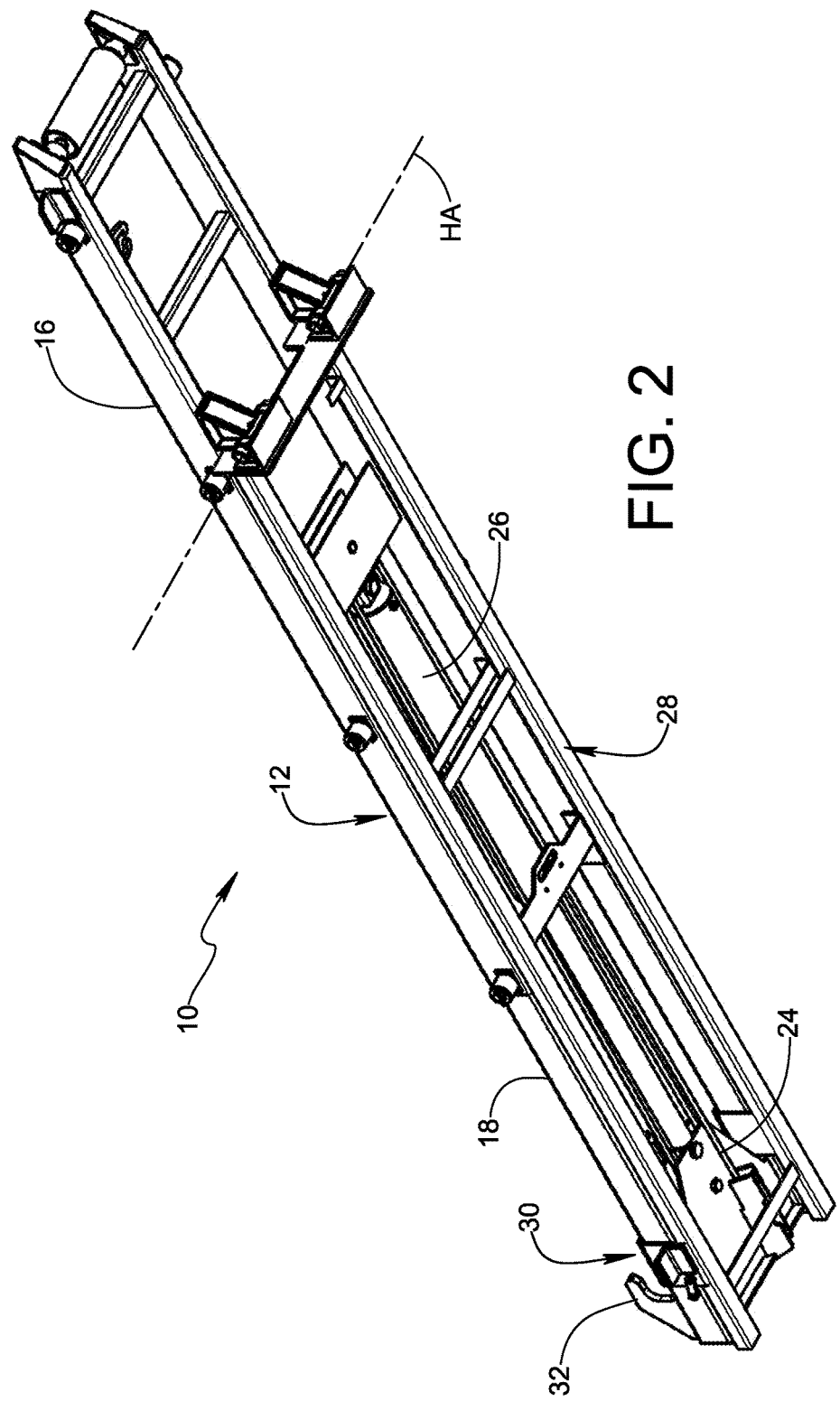
FIG. 2 is another perspective view of the cable hoist apparatus shown in FIG. 1.

A roll-off apparatus formed in accordance with an embodiment of the present invention is shown in FIGS. 1, 2, and 5A-5F and is identified generally by reference numeral 10. Apparatus 10 is mountable on a truck or similar vehicle, and includes a cable hoist mechanism connectable to a container. As will be apparent from the detailed description that follows, apparatus 10 is useful for loading and unloading containers of various sizes onto and off of a roll-off vehicle in a safe and efficient manner.

Figure 5A:
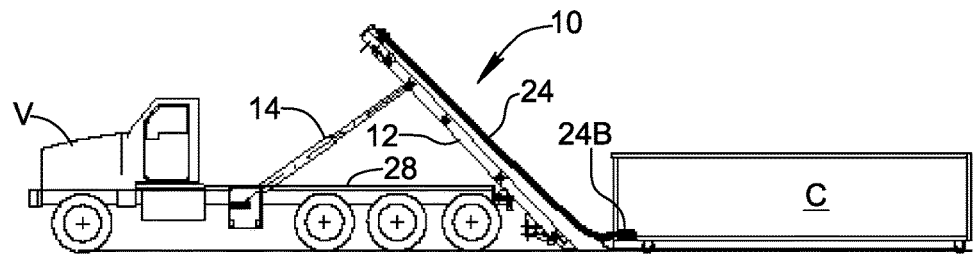
FIG. 5A is a side elevational view of the cable hoist apparatus on a roll-off vehicle, wherein the top frame of the cable hoist apparatus is rearwardly inclined and the head portion of the top frame is in its retracted position in preparation for loading a container onto the vehicle.
Figure 5B:
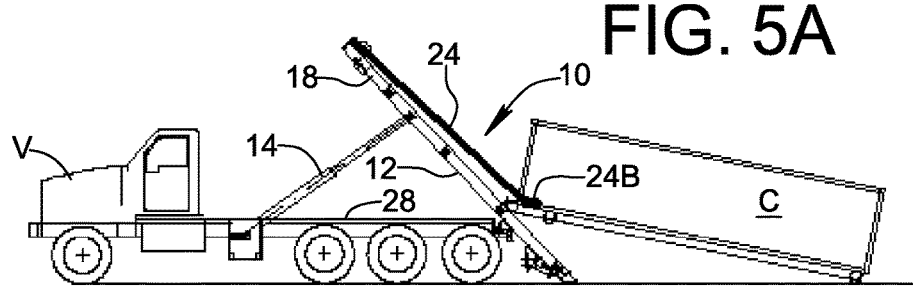
FIG. 5B is a view similar to that of FIG. 5A, wherein the head portion of the top frame is displaced slightly from the retracted position toward its extended position to begin hoisting the container onto the top frame.
Figure 5C:
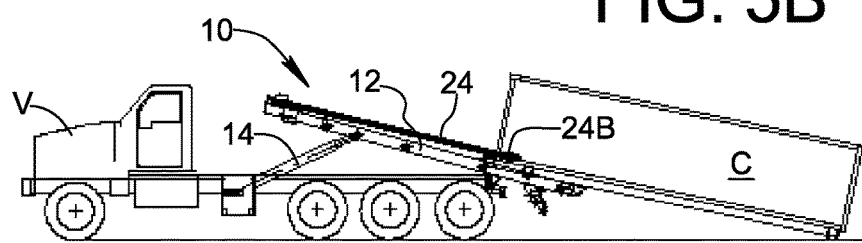
FIG. 5C is a view similar to that of FIG. 5B, wherein the top frame is pivoted relative to the vehicle toward a horizontal home position.
Figure 5D:
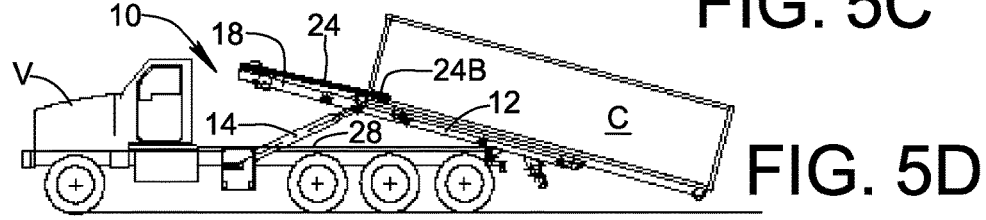
FIG. 5D is a view similar to that of FIG. 5C, wherein the head portion of the top frame is displaced further toward its extended position to continue hoisting the container onto the top frame.
Figure 5E:
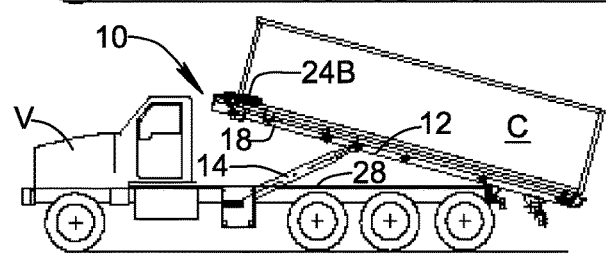
FIG. 5E is a view similar to that of FIG. 5D, wherein the head portion of the top frame is displaced further to its extended position to finish hoisting the container onto the top frame.
Figure 5F:
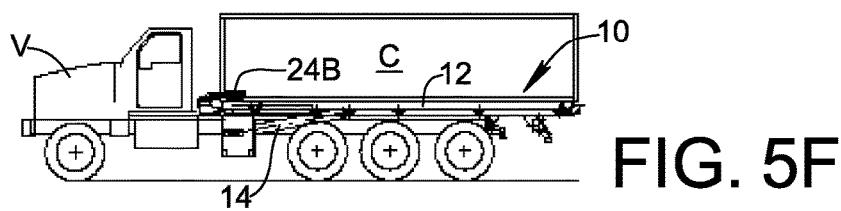
FIG. 5F is a view similar to that of FIG. 5E, wherein the top frame is pivoted relative to the vehicle into the horizontal home position to complete the container loading process.

Apparatus 10 generally comprises a top frame 12 and a pair of laterally spaced lift actuators 14, only one of the lift actuators being visible in FIGS. 5A-5F. Top frame 12 is mounted on a vehicle V to pivot about a transverse hinge axis HA relative to the vehicle. As shown in FIG. 5F, top frame 12 has a horizontal home position relative to vehicle V. Opposite ends of each lift actuator 14 are pivotally mounted to vehicle V and top frame 12, respectively. Lift actuators 14 are operable to rearwardly incline top frame 12 relative to vehicle V by pivoting the top frame about hinge axis HA away from the horizontal home position. For example, lift actuators 14 may be extended to tilt top frame 12 as shown in FIG. 5A, and may be retracted such that top frame 12 assumes its horizontal home position as shown in FIG. 5F. Lift actuators 14 may be hydraulic actuators. Alternatively, lift actuators 14 may be electromechanical actuators. While two laterally spaced lift actuators 14 may be used, it is conceivable to practice the invention using only one lift actuator which may be centrally located for balanced loading.

Top frame 12 includes a main portion 16 and a head portion 18 movably connected to main portion 16 for longitudinally directed displacement relative to the main portion. For example, main portion 16 and head portion 18 may be telescopically adjustable, wherein a pair of longitudinal side rails 18A, 18B of head portion 18 are slidably received within hollow longitudinal side rails 16A, 16B of main portion 16. Main portion 16 and head portion 18 may be steel weldments. In the depicted embodiment, side rails 16A, 16B include a plurality of support rollers 25 for supporting opposite sides of container C as the container is displaced along top frame 16.

Figure 4:
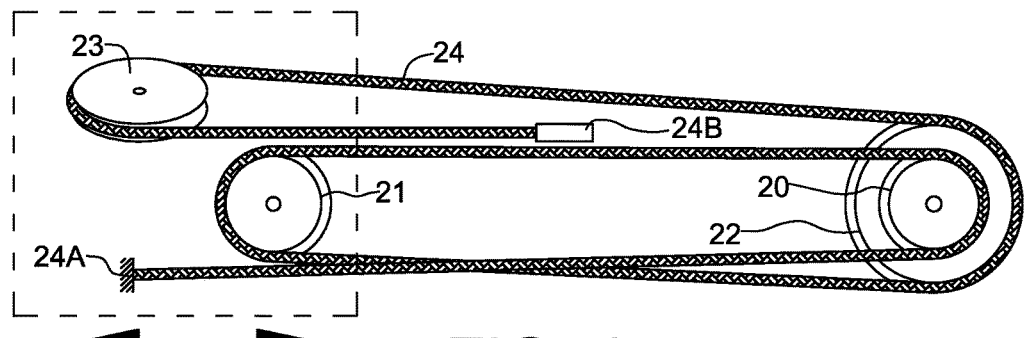
FIG. 4 is a schematic illustration of a sheave and cable arrangement of the cable hoist apparatus.

Top frame 12 also includes a plurality of sheaves including a rear sheave 20 mounted to main portion 16 and a front sheave 23 mounted to head portion 18. As best seen in FIG. 4, the plurality of sheaves may further include a first intermediate sheave 21 mounted to head portion 18 and a second intermediate sheave 22 mounted to main portion 16. Rear sheave 20 and second intermediate sheave 22 may be coaxial as shown in FIG. 4.

A hoist cable 24 has a fixed end 24A coupled to head portion 18 and a free end 24B configured for coupling to a container C. Cable 24 extends from its fixed end 24A to its free end 24B by way of the plurality of sheaves. For example, in the illustrative arrangement depicted in FIG. 4, cable 24 extends from fixed end 24A to free end 24B by successive engagement with rear sheave 20, first intermediate sheave 21, second intermediate sheave 22, and front sheave 23.

Top frame 12 further includes a hoist actuator 26 operable to longitudinally displace head portion 18 relative to main portion 16 between a retracted position shown in FIG. 3A and an extended position shown in FIG. 3B. As may be understood, displacement of head portion 18 toward the extended position moves first intermediate sheave 21 and front sheave 23 away from rear sheave 20 and second intermediate sheave 22, thereby causing free end 24B of cable 24 to be pulled forward toward the front end of top frame 12. The diameters of the sheaves may be chosen to provide a mechanical advantage such that displacement of head portion 18 by hoist actuator 26 through a given distance results in an even greater displacement of cable end 24B toward the front end of top frame 12. For example, the sheaves may be sized and arranged to provide a 5:1 mechanical advantage, i.e. extending head portion 18 one foot draws cable end 24B five feet forward.

Apparatus 10 may further comprise a subframe 28 adapted to be fixedly attached to the vehicle V, and top frame 12 may be pivotally mounted on subframe 12 for pivoting motion about hinge axis HA. In this way, top frame 12 may be mounted on vehicle V by way of subframe 28.

Operation of apparatus 10 to load a container C onto vehicle V will now be described with reference to FIGS. 5A-5F. As shown in FIG. 5A, vehicle V is parked with its rear end adjacent to a front end of container C, lift actuators 14 are extended to rearwardly incline top frame 12, and the free end 24B of cable 24 is coupled to a front coupling element provided on container C. At this stage, hoist actuator 26 and head portion 18 are fully retracted.

In FIG. 5B, hoist actuator 26 begins to extend while top frame 12 is fully inclined, thereby drawing cable end 24B toward the front of top frame 12 and lifting the front end of container C onto top frame 12.

Next, in FIG. 5C, lift actuators 14 are retracted enough to lower top frame 12 to a shallower incline substantially even with an incline of container C. During this stage, hoist actuator 26 is kept at a constant length.

Continuing with FIGS. 5D and 5E, hoist actuator 26 is fully extended to pull cable end 24B and container C all the way to the front of top frame 12. Meanwhile, lift actuators 14 are kept at a constant length.

Finally, as shown in FIG. 5F, lift actuators 14 are fully retracted to bring top frame 12 down to its horizontal home position for transport of container C.

As may be understood, a reverse process may be followed for unloading container C off of vehicle V. It will be appreciated that hoist actuator 26 is operated while top frame 12 is away from its horizontal home position to displace head portion 18 toward an extended position to load a container onto the roll-off vehicle V, and that hoist actuator 26 is operated while top frame 12 is away from its horizontal home position to displace the head portion toward a retracted position to unload the container off of the roll-off vehicle.

Figure 6A:
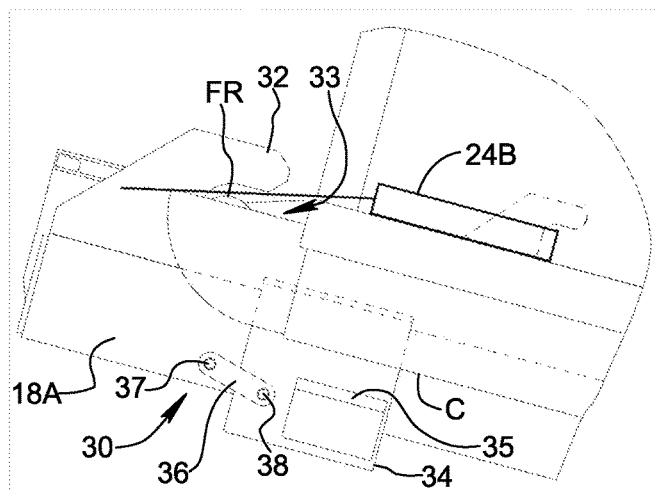
FIG. 6A is a side view illustrating a lockdown mechanism of the cable hoist apparatus in greater detail, wherein a gate member of the lockdown apparatus is shown in an open position.
Figure 6B:
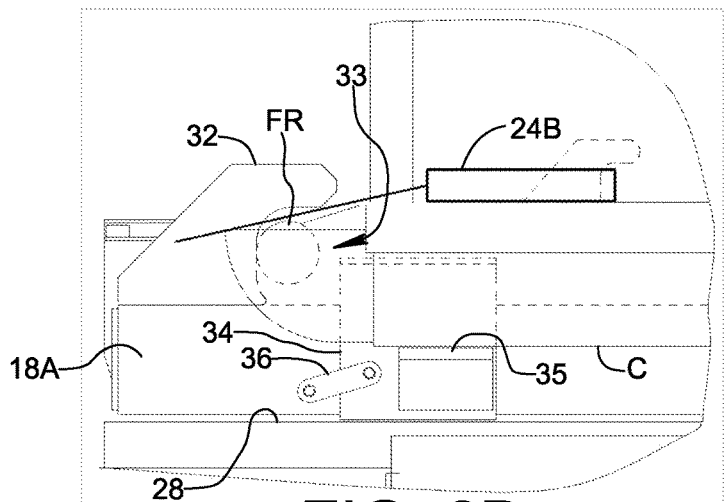
FIG. 6B is a view similar to that of FIG. 6A, wherein the gate member of the lockdown apparatus is shown in a closed position.

Another aspect of the present invention is now described with reference to FIGS. 6A and 6B. Apparatus 10 may further comprise a lockdown mechanism 30 associated with head portion 18 for confining a front roller FR of container C, wherein the lockdown mechanism is automatically locked by pivoting top frame 12 into the horizontal home position, and wherein the lockdown mechanism is automatically unlocked by pivoting the top frame away from the horizontal home position.

In the depicted embodiment, lockdown mechanism 30 includes a front hook member 32 defining a rearwardly facing opening 33 for receiving front roller FR of container, and a gate member 34 movably connected to head portion 18. Gate member 34 is movable relative to head portion 18 between an open position, shown in FIG. 6A, wherein gate member 34 does not block opening 33, and a closed position wherein gate member 34 at least partially blocks opening 33. As may be understood from FIG. 6A, gate member 34 is moved by gravity to the open position when top frame 12 is pivoted away from the horizontal home position. When top frame 12 is pivoted into the horizontal home position as shown in FIG. 6B, subframe 28 engages gate member 34 to move the gate member to the closed position. Gate member 34 may be a hollow tubular member, and longitudinal frame member 18A (or 18B) of head portion 18 may be arranged to extend through tubular gate member 34 with vertical clearance to allow gate member 34 to shift up and down relative to the longitudinal frame member 18A (or 18B). Gate member 34 may be movably connected to longitudinal frame member 18A (or 18B) near a front end of head portion 18 by a link 36 pivotally mounted at a first location to the longitudinal frame member by a pin 37 and pivotally mounted at a second location to the gate member by another pin 38. As indicated in FIG. 3A, top frame 12 may include a pair of lockdown mechanisms 30 respectively associated with the pair of longitudinal frame members 18A, 18B. Lockdown mechanism 30 may be incorporated into a top frame that has no extendable head portion 18 (i.e. a fixed length top frame having longitudinal frame members) by movably a connecting gate member 34 to one or both of the longitudinal frame members. As may be appreciated, the operator will know gate members 34 are deployed into the closed position whenever top frame 12 is brought into its horizontal home position for container transport. Reliance on a spring mechanism is avoided.

Each gate member 34 may include a horizontal support flange 35 projecting laterally therefrom for supporting a side of container C near the front end of the container when top frame 12 is in its horizontal home position. Flange 35 moves with head portion 18, and when gate member 34 is shifted to the closed position, flange 35 becomes aligned with support rollers 25 such that a front portion of container C is supported by the flange. Flange 35 may be provided, for example, by welding or fastening a piece of angle iron on a side wall of gate member 34.

As top frame 12 is tilted away from the horizontal home position, gates 34 and flanges 35 shift down by gravity to the open position, and weight of the container is substantially unloaded from head portion 18. When top frame 12 is rearwardly inclined, load associated with the weight of container C is borne by the stronger structural members of main portion 16, not by the structural members of head portion 18.

While the invention has been described in connection with exemplary embodiments, the detailed description is not intended to limit the scope of the invention to the particular forms set forth. The invention is intended to cover such alternatives, modifications and equivalents of the described embodiment as may be included within the scope of the invention.

What is claimed is:

1. An apparatus for loading and unloading containers of various sizes onto and off of a roll-off vehicle, the apparatus comprising:
    a top frame mounted on the vehicle to pivot about a transverse hinge axis relative to the vehicle, the top frame having a horizontal home position relative to the vehicle; and
    at least one lift actuator operable to rearwardly incline the top frame relative to the vehicle by pivoting the top frame about the hinge axis away from the horizontal home position;
    wherein the top frame includes:
        i) a main portion;
        ii) a head portion movably connected to the main portion for longitudinally directed displacement relative to the main portion;
        iii) a plurality of sheaves including a rear sheave mounted to the main portion, a first intermediate sheave mounted to the head portion, a second intermediate sheave mounted to the main portion, and a front sheave mounted to the head portion, wherein the rear sheave and the second intermediate sheave are coaxial;
        iv) a cable having a fixed end coupled to the head portion and a free end configured for coupling to a container, the cable extending from the fixed end to the free end by successive engagement with the rear sheave, the first intermediate sheave, the second intermediate sheave, and the front sheave; and
        v) a hoist actuator operable to longitudinally displace the head portion relative to the main portion between a retracted position and an extended position;
    wherein the hoist actuator is operated while the top frame is away from the horizontal home position to displace the head portion toward the extended position to load a container onto the roll-off vehicle; and
    wherein the hoist actuator is operated while the top frame is away from the horizontal home position to displace the head portion toward the retracted position to unload the container off of the roll-off vehicle.

2. The apparatus according to claim 1, wherein the apparatus further comprises a subframe fixedly attached to the vehicle, and the top frame is mounted on the vehicle by way of the subframe.

3. The apparatus according to claim 2, further comprising a lockdown mechanism associated with the head portion for confining a front roller of the container, wherein the lockdown mechanism is automatically locked by pivoting the top frame into the horizontal home position, and wherein the lockdown mechanism is automatically unlocked by pivoting the top frame away from the horizontal home position.

4. The apparatus according to claim 3, wherein the lockdown mechanism includes:
    a front hook member defining a rearwardly facing opening for receiving the front roller of the container;
    a gate member movably connected to the head portion, the gate member being movable relative to the head portion between an open position wherein the gate member does not block the opening of the front hook member and a closed position wherein the gate member at least partially blocks the opening of the front hook member;
    wherein the subframe engages the gate member to move the gate member to the closed position when the top frame is pivoted into the horizontal home position; and
    wherein the gate member is moved by gravity to the open position when the top frame is pivoted away from the horizontal home position.

5. An apparatus for loading and unloading containers of various sizes onto and off of a roll-off vehicle, the apparatus comprising:
    a top frame mounted on the vehicle to pivot about a transverse hinge axis relative to the vehicle, the top frame having a horizontal home position relative to the vehicle; and
    at least one lift actuator operable to rearwardly incline the top frame relative to the vehicle by pivoting the top frame about the hinge axis away from the horizontal home position;
    wherein the top frame includes:
        i) a main portion;
        ii) a head portion movably connected to the main portion for longitudinally directed displacement relative to the main portion;
        iii) a plurality of sheaves including a rear sheave mounted to the main portion and a front sheave mounted to the head portion;
        iv) a cable having a fixed end coupled to the head portion and a free end configured for coupling to a container, the cable extending from the fixed end to the free end by way of the plurality of sheaves; and
        v) a hoist actuator operable to longitudinally displace the head portion relative to the main portion between a retracted position and an extended position;
    wherein the hoist actuator is operated while the top frame is away from the horizontal home position to displace the head portion toward the extended position to load a container onto the roll-off vehicle;
    wherein the hoist actuator is operated while the top frame is away from the horizontal home position to displace the head portion toward the retracted position to unload the container off of the roll-off vehicle;
    wherein the apparatus further comprises a subframe fixedly attached to the vehicle, and the top frame is mounted on the vehicle by way of the subframe;

further comprising a lockdown mechanism associated with the head portion for confining a front roller of the container, wherein the lockdown mechanism is automatically locked by pivoting the top frame into the horizontal home position, and wherein the lockdown mechanism is automatically unlocked by pivoting the top frame away from the horizontal home position;

wherein the lockdown mechanism includes:
a front hook member defining a rearwardly facing opening for receiving the front roller of the container;
a gate member movably connected to the head portion, the gate member being movable relative to the head portion between an open position wherein the gate member does not block the opening of the front hook member and a closed position wherein the gate member at least partially blocks the opening of the front hook member;
wherein the subframe engages the gate member to move the gate member to the closed position when the top frame is pivoted into the horizontal home position; and
wherein the gate member is moved by gravity to the open position when the top frame is pivoted away from the horizontal home position; and
wherein the gate member includes a support flange for supporting a front portion of the container when the top frame is in the horizontal home position.

6. An apparatus for loading and unloading containers of various sizes onto and off of a roll-off vehicle, the apparatus comprising:
a top frame mounted on the vehicle to pivot about a transverse hinge axis relative to the vehicle, the top frame having a horizontal home position relative to the vehicle; and
at least one lift actuator operable to rearwardly incline the top frame relative to the vehicle by pivoting the top frame about the hinge axis away from the horizontal home position;
wherein the top frame includes:
 i) a main portion;
 ii) a head portion movably connected to the main portion for longitudinally directed displacement relative to the main portion;
 iii) a plurality of sheaves including a rear sheave mounted to the main portion and a front sheave mounted to the head portion;
 iv) a cable having a fixed end coupled to the head portion and a free end configured for coupling to a container, the cable extending from the fixed end to the free end by way of the plurality of sheaves; and
 v) a hoist actuator operable to longitudinally displace the head portion relative to the main portion between a retracted position and an extended position;
wherein the hoist actuator is operated while the top frame is away from the horizontal home position to displace the head portion toward the extended position to load a container onto the roll-off vehicle;
wherein the hoist actuator is operated while the top frame is away from the horizontal home position to displace the head portion toward the retracted position to unload the container off of the roll-off vehicle;
wherein the apparatus further comprises a subframe fixedly attached to the vehicle, and the top frame is mounted on the vehicle by way of the subframe;
further comprising a lockdown mechanism associated with the head portion for confining a front roller of the container, wherein the lockdown mechanism is automatically locked by pivoting the top frame into the horizontal home position, and wherein the lockdown mechanism is automatically unlocked by pivoting the top frame away from the horizontal home position;

wherein the lockdown mechanism includes:
a front hook member defining a rearwardly facing opening for receiving the front roller of the container;
a gate member movably connected to the head portion, the gate member being movable relative to the head portion between an open position wherein the gate member does not block the opening of the front hook member and a closed position wherein the gate member at least partially blocks the opening of the front hook member;
wherein the subframe engages the gate member to move the gate member to the closed position when the top frame is pivoted into the horizontal home position; and
wherein the gate member is moved by gravity to the open position when the top frame is pivoted away from the horizontal home position; and
wherein the head portion of the top frame includes a longitudinal frame member, the gate member is tubular, and the longitudinal frame member extends through the tubular gate member.

7. The apparatus according to claim 6, wherein the gate member is movably connected to the head portion by a link pivotally mounted at a first location to the longitudinal frame member and pivotally mounted at a second location to the gate member.

8. The apparatus according to claim 6, wherein the top frame includes a pair of longitudinal frame members and the apparatus comprises a pair of the lockdown mechanisms respectively associated with the pair of longitudinal frame members.

9. An apparatus for loading and unloading a container onto and off of a roll-off vehicle, the apparatus comprising:
a subframe configured for attachment to the vehicle;
a top frame mounted on the subframe to pivot about a transverse hinge axis relative to the vehicle, the top frame having a horizontal home position relative to the vehicle;
at least one lift actuator operable to rearwardly incline the top frame relative to the vehicle by pivoting the top frame about the hinge axis away from the horizontal home position;
a cable hoist mechanism associated with the top frame, the cable hoist mechanism include a cable having a fixed end coupled to the top frame and a free end configured for coupling to the container; and
a lockdown mechanism associated with the top frame for confining a front roller of the container, wherein the lockdown mechanism is automatically locked by pivoting the top frame into the horizontal home position, and wherein the lockdown mechanism is automatically unlocked by pivoting the top frame away from the horizontal home position;
wherein the lockdown mechanism includes:
a front hook member defining a rearwardly facing opening for receiving the front roller of the container; and
a gate member movably connected to the top frame, the gate member being movable relative to the top frame between an open position wherein the gate member does not block the opening of the front hook member and a closed position wherein the hook member at least partially blocks the opening of the front hook member;

wherein the subframe engages the gate member to move the gate member to the closed position when the top frame is pivoted into the horizontal home position;

wherein the gate member is moved by gravity to the open position when the top frame is pivoted away from the horizontal home position; and wherein the gate member includes a support flange for supporting a front portion of the container when the top frame is in the horizontal home position.

10. An apparatus for loading and unloading a container onto and off of a roll-off vehicle, the apparatus comprising:
a subframe configured for attachment to the vehicle;
a top frame mounted on the subframe to pivot about a transverse hinge axis relative to the vehicle, the top frame having a horizontal home position relative to the vehicle;
at least one lift actuator operable to rearwardly incline the top frame relative to the vehicle by pivoting the top frame about the hinge axis away from the horizontal home position;
a cable hoist mechanism associated with the top frame, the cable hoist mechanism include a cable having a fixed end coupled to the top frame and a free end configured for coupling to the container; and
a lockdown mechanism associated with the top frame for confining a front roller of the container, wherein the lockdown mechanism is automatically locked by pivoting the top frame into the horizontal home position, and wherein the lockdown mechanism is automatically unlocked by pivoting the top frame away from the horizontal home position;

wherein the lockdown mechanism includes:
a front hook member defining a rearwardly facing opening for receiving the front roller of the container; and
a gate member movably connected to the top frame, the gate member being movable relative to the top frame between an open position wherein the gate member does not block the opening of the front hook member and a closed position wherein the hook member at least partially blocks the opening of the front hook member;
wherein the subframe engages the gate member to move the gate member to the closed position when the top frame is pivoted into the horizontal home position;
wherein the gate member is moved by gravity to the open position when the top frame is pivoted away from the horizontal home position; and
wherein the top frame includes a longitudinal frame member, the gate member is tubular, and the longitudinal frame member extends through the tubular gate member.

11. The apparatus according to claim 10, wherein the gate member is movably connected to the head portion by a link pivotally mounted at a first location to the longitudinal frame member and pivotally mounted at a second location to the gate member.

12. The apparatus according to claim 10, wherein the top frame includes a pair of longitudinal frame members and the apparatus comprises a pair of the lockdown mechanisms respectively associated with the pair of longitudinal frame members.

* * * * *